Sept. 16, 1941.  W. P. WILLS  2,256,304

CONTROL APPARATUS

Filed Aug. 19, 1937

INVENTOR.
WALTER P. WILLS.
BY George W. Munsclamp
ATTORNEYS.

Patented Sept. 16, 1941

2,256,304

UNITED STATES PATENT OFFICE 2,256,304

CONTROL APPARATUS

Walter P. Wills, Philadelphia, Pa., assignor to The Brown Instrument Company, Philadelphia, Pa., a corporation of Pennsylvania Application August 19, 1937, Serial No. 159,875

25 Claims. (Cl. 236—69)

This invention relates to control instrumentalities and more particularly the invention relates to electrical control instrumentalities of the kind which control the application of a quantity in response to fluctuations of a variable condition to maintain the condition constant.

An object of the invention is to provide a control system of the type referred to above which utilizes electronic valves.

Another object of the invention is to provide improved electronic means especially adapted for use in an automatic control system which shall be relatively simple in construction and which may be operated from a commercial alternating current supply source without the use of transformers and power rectifiers.

A further object of the invention is to provide an automatic control system of the type referred to above which is adapted to maintain a condition under control at a predetermined value without hunting.

The various features of novelty which characterize my invention are pointed out with particularity in the claims annexed to and forming a part of this specification. For a better understanding of the invention, however, its advantages and specific objects obtained with its use, reference should be made to the accompanying drawing and descriptive matter in which I have illustrated and described a preferred embodiment of the invention.

Figure 1:
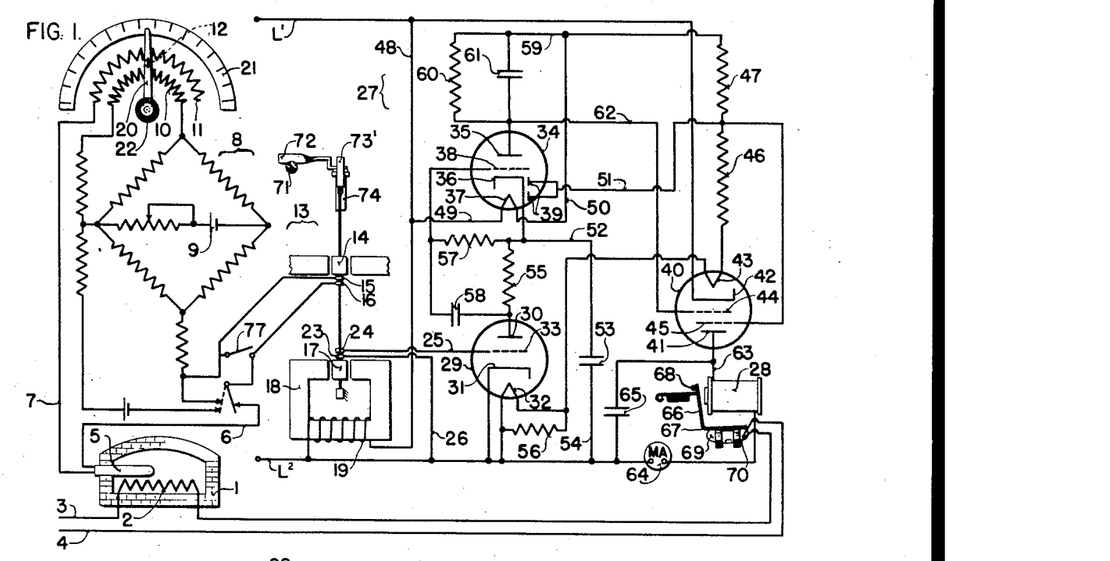
Fig. 1 is a diagrammatic view illustrating one embodiment of the invention as adapted for use in controlling the temperature of a furnace.

In Fig. 1 of the drawing, I have illustrated, more or less diagrammatically, a furnace or other compartment to be heated at 1 in which an electrical heating element 2 is arranged and adapted to be supplied with energizing current from supply conductors 3 and 4. A thermocouple 5, which is sensitively responsive to variations in temperature, is mounted in the furnace 1 and has its terminals connected by conductors 6 and 7 to the terminals of a deflectional potentiometric measuring network 8 at a point remote from the furnace 1.

The potentiometer network 8 may be of any suitable type such as the Brown potentiometer circuit disclosed in the Harrison Patent 1,898,124 issued February 21, 1933, and for the present purposes it is sufficient to note that the potentiometer circuit 8 includes a circuit branch comprising the thermocouple 5, an opposing circuit branch including a source of known potential, such as a battery 9 and a pair of resistors 10 and 11, a variable portion of which may be connected into the opposed branches by means of a sliding contact 12 whereby the respective effects of the variable and the known sources are made equal and opposite. Differences in the variable and known sources of potential are adapted to be detected by a galvanometer 13, the moving coil 14 of which is connected in the circuit branch including the thermocouple 5, so that when the variable and known sources of potential are equal and opposite the galvanometer moving coil will be rendered undeflected when the circuit is balanced for a predetermined value of the E. M. F. of the thermocouple with the contact 12 in a corresponding position along the slidewire resistors 10 and 11.

As illustrated the moving coil 14 of galvanometer 13 is connected in the conductor 6 by means of slip rings 15 and 16, and a pick-up coil 17 is connected to the pivot of the galvanometer moving coil. The pick-up coil 17 is positioned between the poles of a field structure 18 having a field winding 19 which is adapted to be energized from the alternating current supply lines L' and L², and is preferably, although not necessarily, so arranged that when the galvanometer is in its undeflected position the pick-up coil will be slightly in inductive relation with the alternating magnetic field set up by the field structure. The extent to which the pick-up coil 17 is in inductive relation with this alternating magnetic field and the manner in which the adjustment may be effected is described hereinafter.

For facilitating the adjustment of the instrument to control the temperature of the furnace 1 at the desired value the potentiometer sliding contact 12 may be mounted on a contact arm 20 which desirably is arranged in cooperative relation with a suitably calibrated scale 21 and is adapted to be rotated to any desired position along the scale by a knob 22.

When the temperature of the furnace 1 varies in one direction or the other from the desired value, the generated thermocouple voltage will change to a corresponding extent and as a result the thermocouple and opposed potentiometer voltages will become unequal in value and current will flow in one direction or the other through the galvanometer moving coil 14. The galvanometer moving coil thus energized will deflect in a corresponding direction and rotate the pick-up coil 17 to a new position between the poles of the field structure 18.

The alternating voltage induced in the pick-up coil 17 from the field created by the winding 19 is connected by slip rings 23 and 24 and conductors 25 and 26 to the input terminals of an electronic amplifier 27 which is employed to amplify the induced voltage and the amplified quantity is employed to control the energization of a suitable relay 28 into its open or closed position.

The amplifier 27 illustrated is especially desirable in a system where simplicity, compactness and ease of construction are essential features for, as will be described it may be operated directly from the alternating current supply conductors L' and L² and does not require the use of power rectifiers or transformers. As shown, the conductor 25 is connected to the control grid 33 of an electronic valve 29 and the conductor 26 is connected to the cathode 31 thereof. The valve 29 is a heater type triode and includes an anode 30, the cathode 31, a heater filament 32, and the control grid 33. The heater filament 32 is adapted to receive energizing current from the alternating supply conductors L' and L² and is connected in a series circuit thereacross which includes the heater filaments 37 and 43 of a pair of electronic valves 34 and 40 and a pair of resistors 46 and 47. It is noted that this circuit in effect comprises a voltage divider from which various potentials may be tapped to supply energizing voltages to the valves 34 and 40.

The valve 34 is a heater type duplex-diode-triode and includes an anode 35, a cathode 36, the heater filament 37, a control grid 38 and a pair of diode plates 39, and the valve 40 is a tetrode preferably of the type known commercially as beam power amplifier tubes and includes an anode 41, a cathode 42, the heater filament 43, a control grid 44, and a screen grid 45.

As will become apparent the valve 34 is employed to supply direct current voltage to the anode circuit of valve 29 and also to further amplify the amplified quantity of the voltage induced in the pilot coil 17 which is impressed upon the input circuit thereof by the valve 29. Anode voltage is supplied the valve 29 through a circuit which utilizes the rectifying action of the diode plates 39 of valve 34 and which may be traced from the supply conductor L' to a conductor 48, conductor 49, heater filament 37, a conductor 50, resistor 47, a conductor 51, the diode plates 39, cathode 36, and a conductor 52 to one terminal of a condenser 53 which constitutes the positive side of a half wave rectifying unit. The condenser 53 has its negative terminal connected by a conductor 54 to the supply conductor L² and operates to smooth out ripples in the rectified current flow through the circuit including the diode plates 39 and cathode 36 which impresses a definite constant voltage across its terminals. As illustrated, the anode 30 of valve 29 is connected to the positive side of condenser 53 through a resistor 55 and the cathode 31 is connected to the negative side thereof.

In order to limit the flow of ripple current through the valve 29 to a negligible value and to permit the use of a small filtering condenser 53, the valve 29 is preferably operated with the cathode 31 virtually cold and with a relatively low voltage on the anode circuit. The temperature of the cathode 31 may conveniently be kept at a low value by shunting the heater filament with a resistor 56 so that the filament heating current will be small, and it will be apparent the potential on the anode 30 may be adjusted to a desirable value by properly proportioning resistor 46. Thus, by so adjusting the anode to cathode resistance of valve 29, it will be readily apparent that the discharge of current through the valve 29 by the condenser 53, during the half cycles when the diode plates 39 are negative, may be reduced to a negligible value and the voltage maintained on the anode 30 may be maintained at a substantially constant value. It is noted that this method of increasing the anode to cathode impedance of valve 29 is advantageous over the well known method of applying a negative bias to the control grid in that the valve may be operated over an optimum portion of its plate current-grid voltage characteristic whereas such operation is not possible when the control grid is negatively biased.

When the voltage impressed on the input circuit of valve 29 is zero, that is when the pick-up coil 17 is in zero inductive relation with the magnetic field set up in the field structure 18, the valve 29 will conduct a steady flow of current of predetermined value, and accordingly a substantially constant potential drop will be maintained across the resistor 55. When the pick-up coil is deflected in one direction or the other from its neutral position, however, it is noted an alternating voltage in phase with or 180° out of phase with the line voltage will be impressed on the input circuit of valve 29, and the latter will then be alternately rendered more conductive and less conductive resulting in a pulsating direct current flow through resistor 55 and thereby in a corresponding pulsating potential drop across the latter.

The positive end of resistor 55 is connected to the cathode 36 of valve 34 and a connection is also provided between this end of resistor 55 and the control grid 38 which includes a resistor 57. As shown a condenser 58 is connected in shunt to the resistors 55 and 57 and it will be apparent that when a steady flow of current is conducted by valve 29 a charge will be stored on the condenser 58 which is equal and opposite to the potential drop across resistor 55 whereby the potential drop across resistor 57 will be zero and the control grid 38 will have the same potential as the cathode 36.

When an alternating voltage is impressed on the input circuit of valve 29, however, a pulsating potential drop will appear across the resistor 55 and accordingly the condenser 58 will alternately charge and discharge through the resistor 57 to produce a fluctuating potential drop across the latter, and it will be noted this potential drop will be impressed on the input circuit of valve 34.

Anode voltage is supplied the valve 34 directly from the alternating current supply conductors L' and L² through a circuit which may be traced from the supply conductor L', conductor 48, conductor 49, heater filament 37 of valve 34, conductor 50, a conductor 59 in which a resistor 60 is inserted, anode 35, cathode 36, and conductor 52 to the positive terminal of condenser 53. Thus, the anode circuit of valve 34 is completed through the parallel arrangement consisting of the anode circuit of the valve 29 and the condenser 53, and it is noted the magnitude of the pulsating current conducted by valve 34 is adapted to be varied in accordance with variations in the conductivity of valve 29.

In order to render negligible the effect of variations in the anode current conducted by valve 34 on the potential maintained on the anode circuit of valve 29, the current conducted by the diode section of valve 34 should preferably be made many times as large as the current conducted by the anode circuit thereof. Or in other words the diode plates 39 of valve 34 should be connected to a point on the voltage divider of such potential that the potential of the cathode 36 will be determined primarily by the current conducted in the circuit including the diode plates 39 and the cathode 36.

The obvious manner of rendering the current conducted by the diode section of the valve predominant in determining the potential of cathode 36 would be to connect the diode plates 39 directly to the supply conductor L', but it is noted that if this is done the voltage available for the anode circuit of valve 34 will be insufficient. Thus, the diode plates 39 must be connected to a point on the voltage divider of such potential that the current conducted by the diodes will be predominant in determining the potential of the cathode 36 and in addition that there will be sufficient voltage available for the anode section of the valve 34.

When a fluctuating potential is impressed on the input circuit of valve 34, this valve will be rendered less conductive or more conductive during the half cycles when the anode 35 is positive depending upon whether the voltage impressed on the input circuit thereof is in phase or displaced 180° in phase with the alternating voltage applied to the anode, and accordingly the current flow through resistor 60 will be varied to a corresponding extent. In order to smooth out the pulsating current flow through resistor 60 a condenser 61 is connected thereacross, and as will be apparent a potential drop will then be produced across resistor 60 which will gradually rise when an alternating potential in phase with the supply line voltage is impressed on the input circuit of valve 34 until a condition of equilibrium is reached and which will gradually fall to a lower value when an alternating voltage 180° out of phase with the supply line voltage is impressed on the input circuit of valve 34. Thus, a negative potential is built up on the anode 35 which is adapted to be varied as the pick-up coil 17 deflects in one direction or the other from its normally balanced position and as will become apparent this negative potential may desirably be employed to control the conductivity of valve 40.

By way of illustration it is noted that when the voltage of the supply conductors is 110 volts, the valve 29 may be of a type known commercially as a 6F5 type, the valve 34 may be a type 6Q7, the valve 40 may be a type 25L6, and correspondingly suitable values for the various circuit constants may be as follows:

| Part | Value |
| --- | --- |
| 46 | 100 ohms. |
| 47 | 175 ohms. |
| 55 | 1 megohm. |
| 56 | 50 ohms. |
| 57 | 1 megohm. |
| 60 | 1 megohm. |
| 53 | .5 microfarad. |
| 58 | .05 microfarad. |
| 61 | .05 microfarad. |

As illustrated the anode circuit of valve 40 is connected in an inverted position across the alternating supply conductors L' and L² with respect to the manner of connection of the valve 34 thereacross so that the valve 40 will be non-conductive during the half cycles when the valve 34 is conductive, and conductive when the valve 34 is non-conductive. Due to the action of condenser 61, however, the potential drop across resistor 60 will persist during the half cycles when the valve 34 is non-conductive and may, therefore, be employed to control the conductivity of valve 40 which is conductive during these half cycles. As shown the negative end of resistor 60 is connected by a conductor 62 to the control grid 44 of valve 40 and the positive end of resistor 60 is connected by means of conductor 50, the heater filament 37 of valve 34, and conductors 49 and 48 to the cathode 42 so that the potential drop across resistor 60 will be impressed on the input circuit of valve 40.

Anode voltage is supplied the valve 40 through a circuit which may be traced from the supply conductor L², a conductor 63 in which a milliammeter 64 and the relay 28 are inserted, the anode 41, and cathode 42 to the supply conductor L'. The screen grid 45 is desirably maintained at a potential which is somewhat lower than the potential applied the anode 41 and may be connected to the point of connection of resistors 46 and 47.

Thus the valve 40 is adapted to be alternately rendered conductive and non-conductive and the amplitude of the pulsating current conducted thereby is adapted to be controlled in accordance with the direct current potential drop across resistor 60. In order to smooth out the pulsating current flow through the relay 28 and the milliammeter 64 to thereby prevent chattering of the relay and to facilitate reading of the milliammeter, a condenser 65 is preferably connected across these units.

An armature 66, which is shown pivoted at a point 67 and gravity or spring biased for rotation in a counterclockwise direction into engagement with a stop 68, is arranged in cooperative relation with the relay 28 and is adapted to be rotated in a clockwise direction into engagement with the relay core when the relay is energized. The armature 66 may be formed in the shape of a right angle and the point 67 at which it is pivoted may conveniently be at the bend. One arm is directed in an upward direction and is adapted to move between the stop 68 and the relay 28, and the other arm which is adapted to be moved about a horizontal position carries a mercury switch 69. The mercury switch 69 includes contacts 70 which are adapted to be closed when the armature 66 is in its extreme clockwise position and to be opened when the armature is in its extreme counterclockwise position as shown.

As illustrated the contacts 70 are connected in a circuit including the heating resistor 2 and the power supply conductors 3 and 4 so that when the relay 28 is energized the mercury switch 69 will be actuated into its closed position to close an energizing circuit to the resistor 2. Thus, as the temperature of the furnace 1 rises above or falls below a predetermined value at which it is desired to control the temperature, the mercury switch 69 will be actuated to its open and closed position accordingly to thereby cut off or supply more heat to the furnace.

As was mentioned hereinbefore, I contemplate two modes of operation for my control system. In accordance with one method I contemplate operation in which the pick-up coil 17 is normally slightly in inductive relation with the magnetic field set up in the field structure 18 and in which the phase of the induced voltage is not changed as the relay 28 is actuated to its open and closed position, but only the amplitude of the induced voltage is varied. By so operating my control system it is noted the effects of extraneous voltages which may be induced in the pick-up coil in the normal operating position of the latter may be minimized, and in addition the relative adjustment of the pick-up coil 17 and field structure 18 required may desirably be employed to cause positive deenergization of the relay 28 upon deenergization of the galvanometer moving coil 14, which deenergization may be caused by thermocouple failure, for example. This latter feature will be described more in detail hereinafter.

When extraneous voltages are induced in the pick-up coil in the normal operating position of the latter, and the instrument is adjusted as it would necessarily have to be adjusted to be unresponsive to the currents produced by the extraneous voltages, a "dead spot" will be introduced into the operation of the instrument. Such extraneous voltages may be due to the presence of magnetic material external to the field structure 18 which may cause distortion of the magnetic field or may be due to non-uniformity of the field structure itself. As will be readily appreciated it is extremely difficult to construct a field structure in which the magnetic field will be exactly uniform. When the magnetic field is not uniform and the pick-up coil is in a position in which the induced voltage therein should be zero, the latter may have induced therein voltages of harmonic frequencies which are unstable and may operate to energize the relay 28 into its closed position. It is noted the amplifier 27 does not distinguish between frequencies as does the usual amplifier and will amplify and translate all frequencies over a wide range into a direct current potential which may be employed to control the conductivity of valve 40.

As will be apparent, when the pick-up coil 17 is deflected in one direction from the position in which it is in zero inductive relation with the fundamental frequency of the alternating magnetic field set up in the field structure 18, a voltage of one phase will be induced in the pick-up coil to cause actuation of the relay 28 in one direction and when the pick-up coil is deflected in the opposite direction a voltage of the opposite phase will be induced therein to cause actuation of the relay 28 in the opposite direction. If, however, transient induced voltages opposing either or both of the purposely induced voltages appear, the instrument will be prevented to the extent of the character and the magnitude of the transient voltage from effecting the desired actions of relay 28. If the transients are known and constant, the instrument may be so adjusted as to compensate for them, but in any case must be made insensitive to them. Thus a "dead spot" will be introduced into the movement of the pick-up coil and the system will be rendered insensitive to a corresponding extent.

Such a "dead spot" is undesirable, however, in a controller of the type disclosed, and I prefer to so operate the system that the phase of the purposely induced voltage in the pick-up coil does not change as the relay 28 is actuated from its open to its closed position, but only the amplitude of the induced voltage is changed. By adjusting the amplitude of the induced voltage in the pick-up coil, when the galvanometer moving coil is in its position of electrical balance, to a value equal to or greater than the transient induced voltages in the pick-up coil, it will be apparent that the transient voltages will have no effect on the operation of the system. Or in other words, when the pick-up coil is normally in inductive relationship with the fundamental frequency of the alternating mganetic field set up in the field structure 18, the effect of the transient voltages induced in the pick-up coil will be minimized and more stable operation of the instrument may be obtained.

As will be apparent, in control systems of this type it is desirable that upon a thermocouple or amplifier valve burnout, or other failure of the control apparatus, occurring when the relay 28 is in its closed position that the apparatus shall "fail safe," that is any one of the failures enumerated shall result in actuation of the relay 28 to its open position to thereby shut off the supply of heat to the furnace. Injury to the furnace and its contents which would ordinarily result before the attendant in charge would detect the failure may thus be prevented.

With the apparatus described it will be noted that burnout of any one of the heater filaments of the amplifier valves will result in deenergization of the amplifier. To guard against the objectionable possibility of injury to the furnace and its contents upon thermocouple failure the various components of the apparatus should be so adjusted that when the thermocouple circuit is open circuited, the relay 28 will be deenergized. It is noted this effect may be obtained by so adjusting the instrument that when the potentiometric network 8 is balanced the relay 28 will be deenergized. Thus, when the galvanometer moving coil is deenergized, the relay 28 will be actuated to its open position if it is not already in this position and the supply of heat to the furnace will be shut off. It is noted, however, that it is desirable in a system of this type to provide means for positively causing deenergization of the relay 28 upon thermocouple failure instead of relying solely on the normal adjustment of the system. As mentioned hereinbefore, this end may be attained in my control system by the same adjustment which is effective to minimize the effects of extraneous voltages induced in the pick-up coil 17.

For example, by adjusting the instrument so that when the temperature is at the desired value the galvanometer moving coil 14 will be slightly out of its mechanical zero position, that is, the position which the galvanometer will assume when its terminals are shorted or open circuited, it will be noted that thermocouple failure will result in movement of the galvanometer moving coil to its mechanical zero position. The pick-up coil 17 may be so adjusted with respect to the galvanometer moving coil that in normal operation when the temperature is at the controlled value it will be slightly in inductive relation with the field structure 18, the phase of the induced voltage being such that a positive potential will be impressed on the control grid 33 of valve 29 during the half cycles when the anode 35 of valve 34 is positive, and upon thermocouple burnout the resulting movement of the galvanometer moving coil into its position of mechanical zero adjustment will rotate the pick-up coil 17 into zero inductive relation with the field structure 18, or into a position in which the voltage induced therein will be of the opposite phase to thereby cause positive deenergization of the relay 28.

In accordance with the second method of operation of my control system which I contemplate, the pick-up coil is normally maintained in a position of zero inductive relation with the field structure 18 and adapted to have voltages of opposite phases induced therein as it is deflected in one direction or the other from this normal position. It will be apparent that by providing a field structure 18 especially designed and magnetically shielded the transient voltages induced in the pick-up coil 17 may be minimized and consequently the "dead spot" referred to hereinbefore may be reduced to a minimum.

Thus, with either method of operation, the sensitivity of the instrument may be so adjusted that when the galvanometer moving coil is in its position of electrical balance the flow of current through the relay 28 will be insufficient to actuate the relay to closed position, but on a slight change in temperature and consequent deflection of the galvanometer moving coil the energizing current to the relay will be increased sufficiently to actuate it to closed position.

Figure 2:
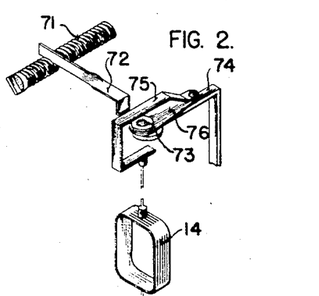
Fig. 2 is a perspective view of a portion of the arrangement of Fig. 1 which is employed for setting the mechanical zero of the galvanometer employed in that arrangement.

This adjustment may conveniently be effected by the arrangement illustrated in detail in Fig. 2 which as shown includes a screw shaft 71 and an associated lever 72. One end of the lever 72 is rigid with a stud 73 which is mounted for rotation on the end of a horizontally projecting arm of a stationary bracket 74, and the other end of the lever is adapted to slide in a groove on the screw shaft 71 so that when the latter is rotated the lever 72 will be rotated about its pivot thereby rotating the stud 73. A flexible U-shaped member 75 is rigidly connected at the end of one arm to the end of a lever 76 the other end of which is rigid with the stud 73. The lever 76 extends back along the projecting arm of bracket 74 and, when the lever 72 is in a mid position along the screw shaft 71, the lever 76 will be directly above and parallel to the projecting arm of the bracket, and is adapted to be moved out of this parallel position when the screw shaft is rotated. The flexible member 75 is so arranged with respect to the lever 76 that one arm is directly above and parallel to the latter and extends beyond the stud 73, and the other arm is directly below and parallel to the lever 76. The galvanometer suspension wire is fixed to the latter arm of member 75 at a point which is on the axis of rotation of the stud so that when the screw shaft 71 is rotated the galvanometer moving coil 14 and the pilot coil 17 will be rotated with respect to their respective field structures.

It is noted this galvanometer mechanical zero adjustment for adjusting the sensitivity and helping the instrument to "fail safe" may be facilitated when the milliammeter 64 is employed in conjunction therewith for indicating when the adjustment is at the desired value. For example, by short circuiting the terminals of the galvanometer moving coil 14, as by a switch 77, the screw shaft 71 may be rotated until the anode current flow through valve 40 is a desirable value, and by providing a milliammeter of suitable value, this current flow may desirably cause deflection of its pointer half way up scale. Movement of the galvanometer and pilot coil from this mechanically fixed position will then result in the flow of more or less current through the milliammeter 64 and thereby in deflection of its pointer in one direction or the other from the mid-position. Thus, by closing the switch 77, a rapid check may be made as to the mechanical zero adjustment of the galvanometer and if the adjustment is not correct, a correct adjustment may readily be effected by rotation of the screw shaft 71. As shown, a projection may desirably be provided in one end of the latter for facilitating the rotation thereof, as for example, by a suitable key adapted to engage that projection.

As was noted the pulsating anode current conducted by valve 40 is adapted to be controlled in accordance with the magnitude of the direct current potential maintained across resistor 60 and this potential in turn is adapted to be controlled in accordance with the magnitude of the alternating voltage impressed upon the input circuit of valve 29 by the pilot coil 17. Moreover, since the resistor 60 is shunted by the condenser 61, it will become apparent that sudden changes in the alternating voltage induced in the pilot coil 17 will change only slightly the direct current potential drop across resistor 60. Thus, if the galvanometer moving coil 14 and the pilot coil 17 are deflected from their neutral position as a result of jarring or vibration, the resulting transitory voltage induced in the pilot coil 17 will produce only a slight change in the direct current potential drop across resistor 60 which will ordinarily be ineffective to actuate the relay armature 66 into its closed position. If the voltage induced in the pilot coil should persist, however, the potential drop across resistor 60 will be changed sufficiently to cause the relay armature to be actuated into its closed position, but it is noted that as soon as the vibration ceases, the galvanometer and pilot coils will return to their neutral positions and the relay armature will be permitted to assume its open position.

Figure 3:
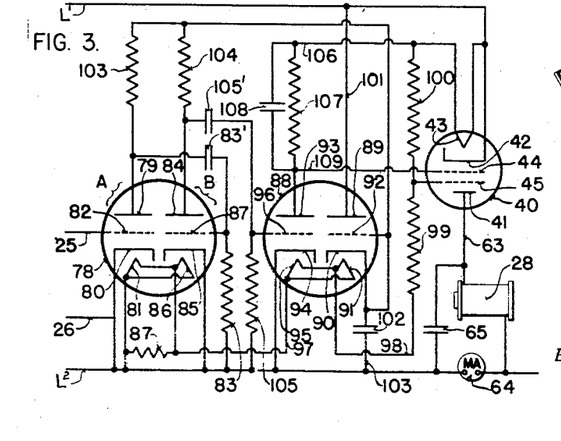
Fig. 3 illustrates a modification of the amplifier shown in Fig. 1.

In Fig. 3 I have illustrated, more or less diagrammatically, a modification of the amplifier arrangement disclosed in Fig. 1 in which an additional stage of amplification is provided and in which the rectifier unit may be connected directly across the supply conductors L' and L². As illustrated the terminals of the pick-up coil 17 (not shown in this arrangement) are connected by conductors 25 and 26 to the input circuit of one triode section of an electronic valve 78 which may desirably be a twin amplifier type including two triodes in one envelope. This triode section includes an anode 79, a cathode 80, a heater filament 81, and a control grid 82 and the output circuit thereof is resistance-capacity coupled by a resistance 83 and a condenser 83' to the input circuit of the second triode section in the envelope. For convenience in describing the circuit connections, the first mentioned triode will be referred to hereinafter as the triode A and the second mentioned triode will be referred to as the triode B.

The triode B includes an anode 84, a cathode 85, a heater filament 86, and a control grid 87. Energizing current is supplied the heater filaments 81 and 86 through a circuit which includes the heater filaments 91 and 95 of a twin type amplifier valve 88, and the heater filament 43 of valve 40, and may be traced from the supply conductor L² to the heater filaments 81 and 86, a conductor 97, heater filaments 91 and 95 of valve 88, a conductor 98 in which a pair of resistors 99 and 100 are inserted, and the heater filament 43 of valve 40 to the supply conductor L'. The pairs of heater filaments 81 and 86, and 91 and 95, respectively, are illustrated as connected in parallel relation, but it will be readily apparent these pairs of heater filaments may be connected in series relation, if desired, and, as illustrated, the heater filaments 81 and 86 are shunted by a suitable resistor 87.

Direct current anode voltage is supplied both triode sections of valve 78 through a circuit which utilizes the rectifying action of the anode 89 and cathode 90 of valve 88 and which may be traced from the supply conductor L' to a conductor 101, and the anode 89 and cathode 90 of one triode section of valve 88 to one terminal of a condenser 102 which constitutes the positive side of a half wave rectifying unit. The negative terminal of condenser 102 is connected by a conductor 103 to the supply conductor L² and, as will be apparent, the condenser 102 operates to smooth out the pulsations in the rectified current flow through the circuit including the anode 89 and cathode 90 of valve 88 which impresses a definite constant voltage across its terminals.

As illustrated, the anode 79 of triode A is connected to the positive terminal of condenser 102 through a resistor 103 and the cathode 80 is connected to the negative side thereof. Similarly, the anode 84 of triode B is connected to the positive side of condenser 102 through a resistor 104 and the cathode 85 is connected to the negative terminal of the condenser. The flow of ripple current through both triode sections of valve 78 is limited to a negligibly small value by operating the valve with the cathodes 80 and 85 virtually cold, the resistor 87 shunting the heater filaments 81 and 86 being provided for this purpose.

It is noted that since individual electrically insulated cathodes are provided for each triode section of valve 88 that it is not necessary to provide means in this arrangement for rendering negligible the effect of variations in the anode current conducted by the triode section including anode 93 on the potentials maintained on the anodes 79 and 84 of valve 78, and furthermore, the full voltage of the supply conductors L' and L² may be applied to the rectifying unit including the anode 89 and cathode 90.

The output circuit of the triode B is resistance capacity coupled by a resistor 105 and a condenser 105' to the input circuit of the triode section of valve 88 which includes the anode 93. Anode voltage is supplied the latter mentioned triode section directly from the alternating current supply conductors L' and L² through a circuit which may be traced from the supply conductor L', heater filament 43 of valve 40, a conductor 106 in which a resistor 107 is inserted, anode 93, and cathode 94 to the supply conductor L². In order to smooth out the pulsating current flow through resistor 107 a condenser 108 of suitable value may desirably be connected thereacross. Thus, when an alternating potential in phase with the supply line voltage is impressed on the input circuit of this triode section, the potential drop across resistor 107 will gradually increase in value until a condition of equilibrium is reached, and when an alternating potential 180° out of phase with the supply line voltage is impressed on the input circuit of this triode, the potential drop across resistor 107 will gradually decrease in value.

Thus, a negative potential is built up on the anode 93 which is adapted to be varied as the pick-up coil 17 deflects in one direction or the other from its normally balanced position, and, as in the arrangement of Fig. 1, this negative potential is employed to control the conductivity of valve 40. Valve 40 is connected across the alternating supply conductors L' and L² in an inverted position with respect to the manner of connection of the triode section including anode 93 thereacross so that the valve 40 will be conductive during the alternate half cycles when the triode section referred to is non-conductive. As illustrated, the negative end of resistor 107 is connected by a conductor 109 to the control grid 44 of valve 40 and the positive end of resistor 107 is connected through the heater filament 43 to the cathode 42.

Anode voltage is supplied the valve 40 through a circuit which may be traced from the supply conductor L', cathode 42, anode 41, and a conductor 63, in which a relay 28 and a milliammeter 64 are inserted, to the supply conductor L². The screen grid 45 is desirably maintained at a potential which is somewhat lower than the potential applied the anode 41 and as shown may be connected to the point of connection of resistors 99 and 100.

Thus, in this arrangement, as in the arrangement of Fig. 1, the valve 40 is adapted to be alternately rendered conductive and non-conductive and the amplitude of the pulsating current conducted thereby is adapted to be controlled in accordance with the direct current potential drop across resistor 107 which corresponds to the resistor 60 of Fig. 1.

Figure 4:
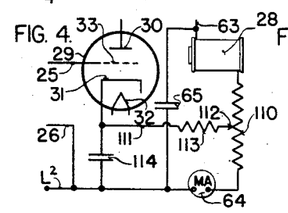
Fig. 4 illustrates a modification of the arrangement disclosed in Fig. 1 including means for modulating the heat input to the furnace.

In Fig. 4, I have illustrated, more or less diagrammatically, a modification of a portion of the arrangement disclosed in Fig. 1 in which means are provided for modulating the heat input to the furnace 1, that is, supplying heat at a steady rate to the furnace when the temperature is at the desired value and proportionately varying the supply of heat thereto in accordance with the extent of deviation of the temperature from the desired value. This end is obtained in this arrangement by providing feed back means for setting up an oscillation in the amplifier whereby the relay 28 will alternately be actuated to its open and closed position when the temperature is at the desired value, and as the temperature of the furnace deviates in one sense or the other from the desired value, the period of the oscillation will be varied proportionately so that the interval during which the relay is in its closed position will be varied with respect to the interval when it will be in its open position. Thus, when the temperature is at the desired value heat will be supplied the furnace at a predetermined rate, but as the temperature deviates in one sense or the other from this value, the rate of heat supply will be correspondingly varied. That is to say, in accordance with this modification of my invention the frequency of the intermittent actuation of relay 28 is variable in accordance with the extent of deviation of the furnace temperature from the desired value. This operation is obtained by utilizing the feed-back means referred to, which feed-back means cooperate with the various other circuit elements of the control system to introduce a variable timing feature into the operation of the relay 28 and in effect comprise variable timing means. This action will be readily distinguished from the action obtained with the arrangement of Figs. 1 and 3 in which on-off action is obtained, that is, the heat supply to the furnace in the devices of those figures is either entirely on or entirely off depending upon whether the temperature of the furnace is above or below the desired value.

Specifically a resistor 110 is inserted in the conductor 63 in series relation with the relay 28 and the milliammeter 64, the negative end of resistor 110 being connected to one end of the relay 28 and the positive end being connected to the supply conductor L² through the milliammeter 64. The cathode 31 of valve 29 is connected by a conductor 111 to a contact 112 which is in engagement with and adjustable along the resistor 110. A resistor 113 is inserted in the conductor 111 and a connection is provided between the cathode 31 and the supply conductor L² which includes a condenser 114.

As will be readily apparent when the valve 40 is rendered conductive the current conducted by this valve will produce a potential drop across resistor 110, a portion of which, depending upon the adjustment of contact 112 along resistor 110, is adapted to be fed back into the input circuit of valve 29.

With this arrangement when the temperature of the furnace is at the desired value the pick-up coil 17 will be slightly in inductive relation with the field structure 18 and the sense of this inductive relation is such as to impress a positive potential on the control grid 33 of valve 29 during the half cycles when the anode 35 of valve 34 is positive. Thus, a negative potential will be impressed on the control grid 38 of valve 34 which results in a potential drop across resistor 60 of such magnitude as to permit the flow of sufficient current through valve 40 to actuate the relay 28 to its closed position.

The resulting potential drop produced across resistor 110 by the flow of current conducted by valve 40 is in the direction to impress a positive potential on the control grid 33 of valve 29, which potential is superimposed on the alternating voltage impressed thereon by the pick-up coil 17, and causes an oscillation in the anode current conducted by valve 40 of sufficient magnitude to cause the relay 28 to be intermittently actuated to its open and closed position. As the voltage impressed on the input circuit of valve 29 by the pick-up coil 17 increases in one direction or the other, the magnitude of this oscillation is varied in such manner as to cause the relay to remain in its closed position for a longer or shorter period of time with respect to the time in which it is in its open position.

For example when the controlled temperature falls below the desired value, the voltage impressed on the input circuit of valve 29 by the pick-up coil 17 will become more and more predominant over the voltage fed back by the resistor 110 until the latter is ineffective to cause opening of the relay 28, and at intermediate values the feed back voltage will be effective to cause the relay 28 to be opened for intervals of varying duration depending upon the extent of deviation of the controlled temperature from the desired value. When the temperature is above the desired value the feed back voltage and the voltage induced by the pick-up coil will act in the same direction, that is, to cause opening of the relay 28, and in this case the feed back voltage will be rendered more and more ineffective as the energizing current to the relay 28 is reduced, but the voltage induced in the pick-up coil will be sufficient to maintain the relay in its open position. At intermediate values the effect of the voltage induced in the pick-up coil to maintain the relay continuously in open position will not be so pronounced and the relay will be actuated to its closed position for shorter and shorter intervals of time as the temperature of the furnace rises higher and higher above the control point. Thus a proportioning action is obtained which operates to supply varying quantities of heat to the furnace as the temperature deviates about the controlled value.

Figure 5:
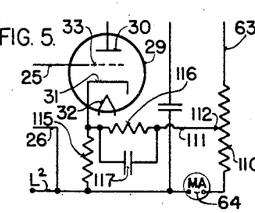
Figs. 5 and 6 illustrate modifications of a portion of the arrangement of Fig. 4.
Figure 6:
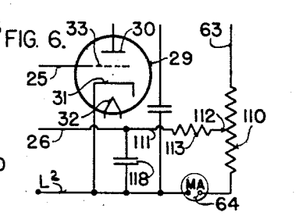

In Figs. 5 and 6, I have illustrated, more or less diagrammatically, modifications of a portion of the arrangement disclosed in Fig. 4 for obtaining such proportional control of the supply of heating medium to the furnace 1. As illustrated in Fig. 5 feed back means have been provided including a resistor 110 connected in the anode circuit of valve 40, a connection between the cathode 31 of valve 29 and a contact 112 engaging and adjustable along the resistor 110, and a biasing resistor 115 connected between the cathode 31 and the supply conductor L². The connection referred to between the cathode 31 and the contact 112 comprises a conductor 111 in which a resistor 116 shunted by a condenser 117 is inserted. The modification illustrated in Fig. 6 includes the resistor 110 and an associated resistor 113 and a condenser 118. As shown the cathode 31 of valve 29 is connected to the supply conductor L² and a connection is provided between the control grid 33 and resistor 110 including the pick-up coil 17 (not shown in Fig. 6), a resistor 113 and a contact 112 engaging and adjustable along the resistor 110. Condenser 118 is connected between the left end of resistor 113, as seen in Fig. 6, and the supply conductor L².

The operation of these modifications is similar to that of the Fig. 4 arrangement for causing an oscillation of the energizing current supplied relay 28 so that the latter will be intermittently actuated to its open and closed position, the duration of the period in which it is in its closed position with respect to the period in which it is in its open position being determined by the extent of deviation of the controlled temperature from the desired value.

While the modifications illustrated in Figs. 4–6 have been illustrated in connection with the amplifier arrangement disclosed in Fig. 1, it will be readily apparent to those skilled in the art that they may be adapted for use with the amplifier arrangement described in Fig. 3. For example, a resistor 110 may be inserted in the conductor 63 between the relay 28 and the milliammeter 64 of this arrangement and a portion of the voltage drop thereacross may be fed back in the manner illustrated in Figs. 4–6 into the input circuit of the triode section of valve 78 which includes the anode 79.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. Automatic control apparatus including a control network, a control relay, means including an electronic amplifier having a continuously graded characteristic and connected to said control relay adapted to energize said control relay continuously in response to a predetermined value of current in said network, adapted to deenergize said control relay continuously in response to a predetermined value of current in said network which is displaced from said first mentioned predetermined value by a predetermined range of current values, and adapted to energize said control relay for intervals the frequency and duration of which are dependent upon the difference between the existing value of said current and one of said predetermined values.

2. Automatic control apparatus including a control network, a control relay, means including an electronic amplifier having a continuously graded characteristic and connected to said control relay adapted to energize said control relay continuously in response to a predetermined value of current in said network which is displaced in one direction from a predetermined range of current values, adapted to deenergize said control relay in response to a predetermined value of current in said network which is displaced in the opposite direction from said predetermined range, and adapted to energize said control relay intermittently for portions of a predetermined period proportional to the difference between the existing value of said current and one of said values.

3. Automatic control apparatus including a control network, a control relay, means including an electronic amplifier having a continuously graded characteristic and connected to said control relay adapted to energize said control relay continuously in response to a predetermined value of current in said input circuit which is displaced in one direction from a predetermined range of current values, adapted to deenergize said control relay in response to a predetermined value of current in said network which is displaced in the opposite direction from said predetermined range, and adapted to energize said control relay independently of fixed timing means intermittently for portions of a predetermined period proportional to the difference between the existing value of said current and one of said values.

4. Apparatus for controlling the actuation of a control device in one sense and in another sense in accordance with the variations in a direct current potential including means continuously tending to cause actuation of said device in one sense, means under control of said direct current potential adapted to cause actuation of said device continuously in the opposite sense when the said direct current potential is displaced in one direction from a predetermined range of values, and means adapted to introduce an oscillation into said direct current potential effective to cause actuation of said device in said opposite sense for portions of a predetermined period dependent upon the difference between the existing mean value of said direct current potential and an extreme value in said predetermined range.

5. Apparatus for controlling the actuation of a control device in one sense and in another sense in accordance with the variations in a direct current potential including means for biasing said device for actuation in one sense, means under control of said direct current potential adapted to control the actuation of said device in the opposite sense, and means adapted to introduce an oscillation into said direct current potential normally effective for causing alternate actuation of said device in opposite senses.

6. Apparatus for controlling the actuation of a control device in one sense and in another sense in accordance with the variations in a direct current potential including means for biasing said device for actuation in one sense, electronic means under control of said direct current potential adapted to control the actuation of said device in the opposite sense, and means adapted to introduce an oscillation into said direct current voltage normally effective for causing alternate actuation of said device in opposite senses.

7. Apparatus for controlling the actuation of a control device in one sense and in another sense in accordance with the variations in a direct current potential including means for biasing said device for actuation in one sense, means under control of said direct current potential adapted to energize said device for actuation in the opposite sense, and means responsive to said energizing means adapted to intermittently render said energizing means ineffective to maintain the actuation of said device in said opposite sense.

8. Means for regulating a variable condition including means responsive to the condition for producing a direct current potential of controllable value and variable from a mean value in accordance with the departure of said condition from a predetermined value, on-off means adapted to control the application of an agent to said condition, and means under control of said direct current potential adapted to control the actuation of said on-off means to its on position and to its off position for intervals of predetermined duration when the condition is at the controlled value and including means for varying the relative duration of said intervals proportionately to the change and the rate of change of said condition from said controlled value.

9. A control circuit network including an electronic value having an anode, cathode, and a control grid, a circuit including the anode and cathode of said valve connected in series with a resistance in the anode circuit and a condenser in the cathode circuit through an anode voltage source, a relay, a resistor, a second electronic valve having an anode, cathode and a control grid, a circuit including the anode and cathode of said second mentioned valve connected in series with said relay and said resistor across an alternating voltage source, a connection including a second resistor between the cathode of said first mentioned valve and an intermediate point on said first mentioned resistor, a connection between said resistance and the input circuit of said second mentioned valve, and means for changing the potential of the control grid of said first mentioned valve.

10. A control circuit network including an electronic valve having an anode, cathode, and a control grid, a circuit including the anode and cathode of said valve connected in series with a resistance in the anode circuit and a resistance in the cathode circuit through an anode voltage source, a relay, a resistor, a second electronic valve having an anode, cathode, and a control grid, a circuit including the anode and cathode of said second mentioned valve connected in series with said relay and said resistor across an alternating voltage source, a connection between said first mentioned resistance and the input circuit of said second mentioned valve, a connection between an intermediate point on said resistor and the cathode of said first mentioned valve including a resistor shunted by a condenser, and means for changing the potential of the control grid of said first mentioned valve.

11. A control circuit network including an electronic valve having an anode, cathode, and a control grid, a circuit including the anode and cathode of said valve connected in series with a resistance through an anode voltage source, a relay, a resistor, a second electronic valve having an anode, cathode, and a control grid, a circuit including the anode and cathode of said second mentioned valve connected in series with said relay and said resistor across an alternating voltage source, a connection between said resistance and the input circuit of said second mentioned valve, a connection including a second resistor between an intermediate point of said first mentioned resistor and the control grid of said first mentioned valve, a condenser connected between the cathode of said first mentioned valve and the end of said second mentioned resistor remote from said intermediate point on said first mentioned resistor, and means for changing the potential of the control grid of said first mentioned valve.

12. Apparatus for controlling the actuation of a control device in accordance with the sign and amplitude of a direct current voltage including means for translating said direct current voltage into an alternating voltage of phase and amplitude variable in accordance with the sign and amplitude of said direct current voltage, means for amplifying and translating said alternating voltage into a direct current voltage variable from a mean value in accordance with the phase and amplitude of said alternating voltage, means for biasing said device for actuation in one sense, and means under control of said last mentioned direct current voltage adapted to control the actuation of said device in the opposite sense.

13. Apparatus for controlling the actuation of a control device in accordance with the sign and amplitude of a direct current voltage including means for translating said direct current voltage into an alternating voltage of phase and amplitude variable in accordance with the sign and amplitude of said direct current voltage, means for amplifying and translating said alternating voltage into a direct current voltage variable from a mean value in accordance with the phase and amplitude of said alternating voltage, means for biasing said device for actuation in one sense, and electronic means under control of said last mentioned direct current voltage adapted to control the actuation of said device in the opposite sense.

14. A control circuit network including an electronic valve having an anode, cathode, heater filament, and a control grid, means for changing the potential of the control grid of said valve, a resistance connected in shunt with said heater filament, a second electronic valve having an anode, cathode, a control grid, and an auxiliary anode, a resistance connected between the grid and cathode of said second mentioned valve, an alternating voltage supply source, a circuit including said auxiliary anode and cathode of said second mentioned valve and said supply source, a resistance connected between the anode of said first mentioned valve and the cathode of said second mentioned valve, a condenser connected between the anode of said first mentioned valve and the control grid of said second mentioned valve, a condenser connected between the cathodes of said first and second mentioned valves, a circuit including a resistance, the anode and cathode of said second mentioned valve and said alternating voltage supply source, a condenser connected across said last mentioned resistance, a third electronic valve having an anode, cathode and a control grid, one terminal of said last mentioned resistance being connected to the cathode and the other terminal being connected to the control grid of said last mentioned valve, a relay, a circuit including the anode and cathode of said last mentioned valve, said relay and said alternating voltage source, the anode and cathode of said last mentioned valve being connected across said source in an inverse manner with respect to the manner of connection of the anode and cathode of the second mentioned valve thereacross, and a condenser connected across said relay.

15. A control circuit network including an electronic valve having an anode, cathode, heater filament, and a control grid, means for changing the potential of the control grid of said valve, a resistance connected in shunt with said heater filament, a second electronic valve having an anode, cathode, a control grid, and an auxiliary anode, a resistance connected between the anode of said first mentioned valve and the cathode of said second mentioned valve, a condenser connected between the cathodes of said first and second mentioned valves, an alternating voltage supply source, a circuit including said auxiliary anode and cathode of said second mentioned valve, said condenser, and said supply source, a resistance connected between the grid and cathode of said second mentioned valve, a condenser connected between the anode of said first mentioned valve and the control grid of said second mentioned valve, a circuit including a resistance, the anode and cathode of said second mentioned valve, said first mentioned condenser and said alternating current supply source, a condenser connected across said last mentioned resistance, a third electronic valve having an anode, cathode and a control grid, one terminal of said last mentioned resistance being connected to the cathode and the other terminal being connected to the control grid of said last mentioned valve, a relay, a resistance, a circuit including the anode and cathode of said last mentioned valve, said relay, said last mentioned resistance and said alternating voltage source, the anode and cathode of said last mentioned valve being connected across said alternating voltage source in an inverse manner with respect to the manner of connection of the anode and cathode of said second mentioned valve thereacross, a condenser connected across said relay and said last mentioned resistance, a circuit connection between an intermediate point on said last mentioned resistance and the cathode of said first mentioned valve, a condenser connected between the cathode of said first mentioned valve and one end of said last mentioned resistance, and a resistance connected in said circuit connection.

16. A control circuit network including an electronic valve having an anode, cathode, heater filament, and a control grid, means for changing the potential of the control grid of said valve, a resistance connected in shunt with said heater filament, a second electronic valve having an anode, cathode, a control grid, and an auxiliary anode, a resistance connected between the anode of said first mentioned valve and the cathode of said second mentioned valve, a condenser connected between the cathodes of said first and second mentioned valves, an alternating voltage supply source, a circuit including said auxiliary anode and cathode of said second mentioned valve, said condenser and said supply source, a resistance connected between the grid and cathode of said second mentioned valve, a condenser connected between the anode of said first mentioned valve and the control grid of said second mentioned valve, a circuit including a resistance, the anode and cathode of said second mentioned valve and said alternating voltage supply source, a condenser connected across said last mentioned resistance, a third electronic valve having an anode, cathode and a control grid, one terminal of said last mentioned resistance being connected to the cathode and the other terminal being connected to the control grid of said last mentioned valve, a relay, a resistance, a circuit including the anode and cathode of said last mentioned valve, said relay, said last mentioned resistance and said alternating voltage source, the anode and cathode of said last mentioned valve being connected across said alternating voltage source in an inverse manner with respect to the manner of connection of the anode and cathode of said second mentioned valve thereacross, a condenser connected across said relay and said last mentioned resistance, a circuit connection between an intermediate point on said last mentioned resistance and the cathode of said first mentioned valve, a resistance connected between the cathode of said first mentioned valve and one end of said last mentioned resistance, a resistance connected in said circuit connection, and a condenser connected across said last mentioned resistance.

17. A control circuit network including an electronic valve having an anode, cathode, heater filament, and a control grid, means for changing the potential of the control grid of said valve, a resistance connected in shunt with said heater filament, a second electronic valve having an anode, cathode, a control grid, and an auxiliary anode, a resistance connected between the anode of said first mentioned valve and the cathode of said second mentioned valve, a condenser connected between the cathodes of said first and second mentioned valves, an alternating voltage supply source, a circuit including said auxiliary anode and cathode of said second mentioned valve, said condenser and said supply source, a resistance connected between the grid and cathode of said second mentioned valve, a condenser connected between the anode of said first mentioned valve and the control grid of said second mentioned valve, a circuit including a resistance, the anode and cathode of said second mentioned valve, said first mentioned condenser and said alternating voltage supply source, a condenser connected across said last mentioned resistance, a third electronic valve having an anode, cathode and a control grid, one terminal of said last mentioned resistance being connected to the cathode and the other terminal being connected to the control grid of said last mentioned valve, a relay, a resistance, a circuit including the anode and cathode of said last mentioned valve, said relay, said last mentioned resistance and said alternating voltage source, the anode and cathode of said last mentioned valve being connected across said alternating voltage source in an inverse manner with respect to the manner of connection of the anode and cathode of said second mentioned valve thereacross, a condenser connected across said relay and said last mentioned resistance, a circuit connection between the control grid of said first mentioned valve and an intermediate point on said last mentioned resistance, a resistance included in said circuit connection, and a condenser connected between one end of said last mentioned resistance and the cathode of said first mentioned valve.

18. A control circuit network including a device creating control effects in accordance with its direction of operation, means for biasing said device for operation in one direction, means responsive to a control condition subjecting said device to an energizing effect in the opposite direction, the said last mentioned means including a condition responsive device, a galvanometer connected to said condition responsive device and adapted to be energized thereby for operation in one sense, an alternating magnetic field, an inductive device adapted to be moved from a position of zero inductive relation with said alternating magnetic field in accordance with deflections of said galvanometer from a predetermined position for inducing an alternating voltage in said inductive device, and means biasing said galvanometer in an opposite sense from that in which it is biased by said condition responsive device and adapted to normally maintain said inductive device slightly in inductive relation with said alternating magnetic field for causing said first mentioned device to be actuated in a "safe sense" upon failure of said condition responsive device, and for minimizing the effect of transient voltages induced in said inductive device.

19. In an electrical control instrument including a coil adapted to be rotated relatively to an alternating magnetic field for inducing an alternating voltage in said coil variable in accordance with deviation in a control condition from a predetermined value, the method of operating said instrument to minimize the effects of extraneous voltages which may be induced in said coil which includes the steps of normally maintaining said coil in inductive relation with the fundamental frequency of said alternating magnetic field and varying the amplitude only of the voltage induced in said coil upon deviation in said condition from said predetermined value.

20. A control network including in combination a potentiometric measuring circuit, means adapted to produce an unbalanced electromotive force in said circuit in accordance with variations in a condition, means under control of said unbalanced electromotive force adapted to produce an alternating potential variable in phase in accordance with the sense of said unbalanced electromotive force, a control circuit including a relay, means biasing said relay for actuation in one sense, and means responsive to said alternating potential adapted to control the magnitude of current in said control circuit in accordance with said phase for actuating said relay in the opposite sense.

21. Cyclically operated control apparatus for a variable condition including an electrical contact, means under control of said condition to open and close said contact in cycles, the relation of the open to the closed period of said contact depending upon the value of the condition and the sum of said open and closed periods in each cycle varying with the value of the condition, said means including an electronic amplifier having a continuously graded characteristic and a solenoid energized by said amplifier.

22. Automatic control apparatus including a control network variable in condition, a control device, an electronic amplifier having a continuously graded characteristic and under control of said control network to energize and deenergize said control device, and variable timing means under control of said control network to regulate the operation of said electronic amplifier as required to effect energization of said control device for portions of a predetermined period depending upon the condition of said control network.

23. Automatic control apparatus including a control network variable in condition, a control device, an electronic amplifier having a continuously graded characteristic and under control of said control network to energize and deenergize said control device, and means under control of said control network and independent of fixed timing means to regulate the operation of said electronic amplifier as required to effect energization of said control device for portions of a predetermined period depending upon the condition of said control network.

24. Automatic control apparatus including a control network variable in condition, a control device, an electronic amplifier having a continuously graded characteristic and connecting said control network and said control device to energize and deenergize said control device under control of said control network, and timing means solely under control of said control network adapted to regulate the operation of said electronic amplifier as required to produce energization of said control device in cycles comprising periods of control in one sense and another sense and of a proportion depending upon the condition of said control network.

25. Automatic control apparatus comprising a control network variable in condition, a control device, a source of electromotive force, an electronic amplifier, having a continuously graded characteristic, connecting said control network and said control device and energized from said source of electromotive force to energize and deenergize said control device under control of said control network, and a connection between said control device and said electronic amplifier adapted to affect the latter in response to energization of said control device under control of said control network and to deenergize said control device following periods of energization of the control device depending upon the condition of said control network.

WALTER P. WILLS.